Nov. 6, 1951     V. C. STERRETT     2,574,299
PISTON CONSTRUCTION
Original Filed Dec. 31, 1947
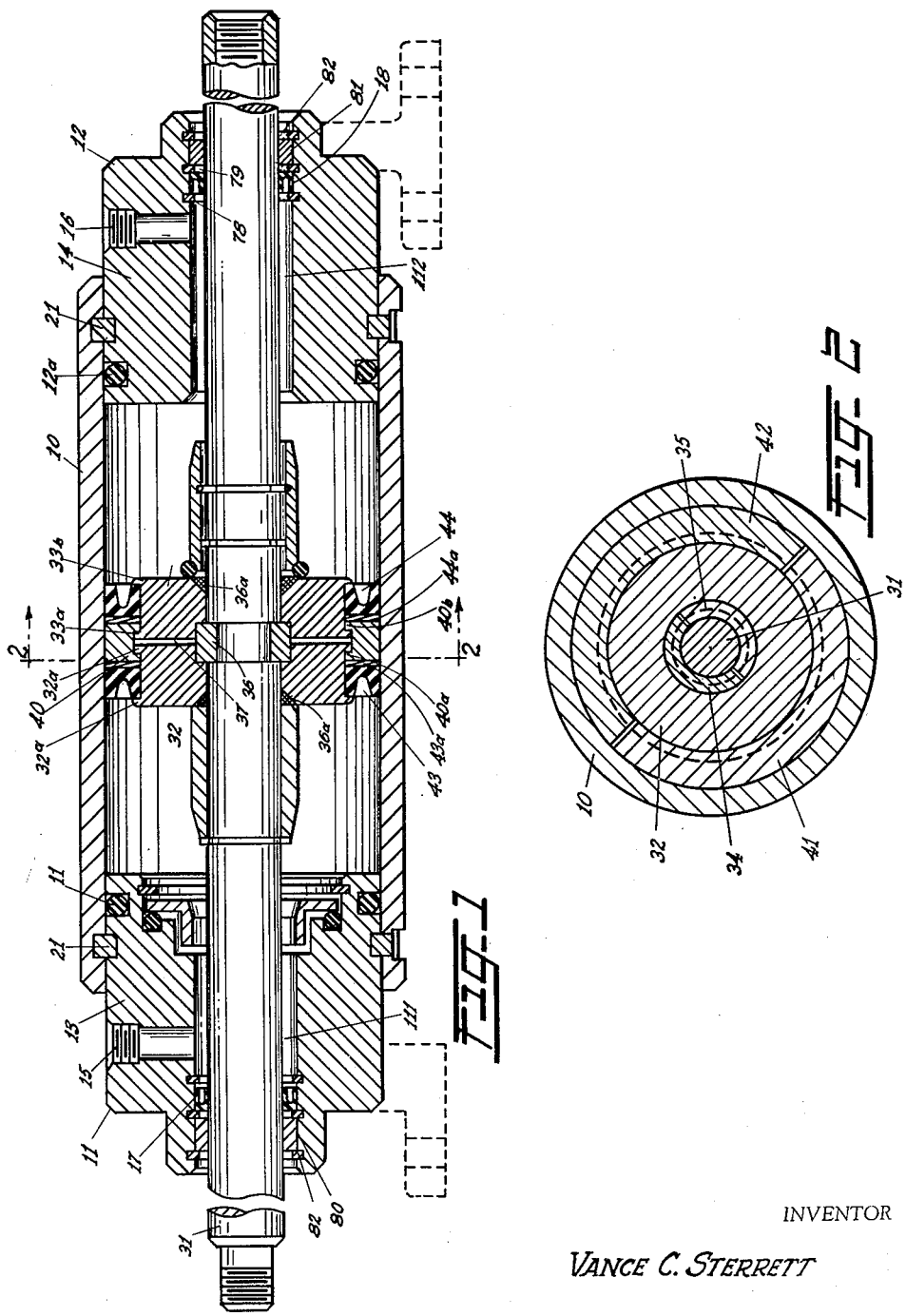
INVENTOR
*VANCE C. STERRETT*
BY *Munn, Liddy & Glaccum*
ATTORNEYS Patented Nov. 6, 1951

2,574,299

UNITED STATES PATENT OFFICE 2,574,299

PISTON CONSTRUCTION

Vance C. Sterrett, Logansport, Ind.

Original application December 31, 1947, Serial No. 794,975, now Patent No. 2,493,602, dated January 3, 1950. Divided and this application August 5, 1949, Serial No. 108,779

9 Claims. (Cl. 309—4)

My present invention relates to fluid motor pistons and is a division of my copending application Serial No. 794,975 filed December 31, 1947, now Patent 2,493,602 granted January 3, 1950.

An object of my invention is the provision of a novel means of constructing a piston and rod assembly wherein the elements interlock in such a manner as to obviate the use of screw threads or other conventional connecting means.

Another object of the invention is to provide a piston comprising complementary face discs which are locked in position on the piston rod by concentric shear and wear rings.

A further object of my invention is the provision of a pair of juxtaposed face discs having peripheral recesses for accommodation of self-adjusting packing rings which cooperate with the inner wall of the fluid motor cylinder.

A still further object of this invention is to provide a piston construction which is economical to manufacture and maintain and which may be quickly and easily assembled or disassembled relative to its associated cylinder.

To these and other ends my invention comprises further improvements and advantages as will be further described in the accompanying specification, the novel features thereof being set forth in the appended claims.

In the drawings:

Figure 1 is a central longitudinal cross section of a power force cylinder embodying my invention.

Figure 2 is a vertical cross section taken on the line 2—2 illustrating the construction and arrangement of the locking rings which secure the piston sections to its shaft and to each other.

Similar reference numerals, in the several figures, indicate similar parts.

In carrying out my invention the fluid power unit comprises a hydraulic cylinder 10 of an internal diameter suitable to the ultimate power to be delivered and of a length selected according to the nature of the work to be performed by the enclosed piston and piston rod. The ends of the cylinder are closed by the opposed heads 11 and 12 having inner or proximate ends 13 and 14 which fit closely within the ends of the cylinder, their remaining outer portions being of such dimensions as to accommodate fluid inlet or outlet ports 15 and 16 and take piston rod packing glands 17 and 18 located outwardly beyond said ports. As is common practice in the operation of hydraulic cylinders the source of fluid pressure be it oil, water or air is connected through a four way control valve to the ports 15 and 16 so that it may alternately be introduced at the one end of the cylinder to act on one side of the piston and allowed to exhaust from the opposite side of the piston. Since this master valve is well known in the art I have omitted illustration thereof.

A detail to be mentioned in regard to the packing glands 17—18 is that snap rings 78—79 are provided both in front and rear of said glands. Outside of the latter the end portions of the shaft are carried by and journaled in journal rings 80—81 which back up the packings and are themselves held in place by snap rings 82, all of said rings being held in place by the engagement of their outer points in annular recesses formed in the walls of the recesses 111 and 112.

The union between the heads and the cylinder is effected by providing the respective overlapping parts with mating annular recesses, of suitable depths which accommodate a locking strip 21. The latter is preferably rectangular in cross section and capable of withstanding a shear strain in excess of any internal pressure that may be applied to a given cylinder. To facilitate the application of the locking strip 21 there is provided an opening in the the wall of the cylinder leading from its recess and at a point in the bottom of the recess in the head there is a drilled hole for the reception of a pin. The outer end of the latter is approximately equal to the depth of recess in the head and extending across the inner end of the locking strip is a recess by means of which the strip is hooked in engagement with the pin when its forward end is inserted in the opening in the wall of the cylinder. From this arrangement of parts it will be seen that by effecting a relative rotation of the cylinder and a cylinder head the locking strip will be drawn inwardly to effect a complete encirclement of the head to securely unite it to the end of the cylinder without the use of any other means of attaching the parts.

In the inner ends 13—14 of the two heads I provide annular channels and insert therein rubber rings 11a and 12a. The cross sectional diameter of these is such that they are normally compressed against the cylinder wall when the heads are inserted.

The piston rod 31 extends through the heads 11 and 12 axially of the cylinder 10 and centrally mounted thereon is the piston the construction of which and the means for holding it rigidly connected to the rod comprises an important part of my invention. As shown in Fig. 1 the piston comprises two similar right and left hand disc shaped parts 32, 33 bored centrally to receive the rod and of a diameter somewhat less than that of the cylinder. On the shaft between the meeting faces of the two discs forming the piston is an annular groove and fitted therein are two semi-circular sections 34, 35 (Fig. 2) which form a shear ring 36 (Fig. 1). One half of the thickness of the ring extends beyond the face of the rod 31 and is received in and held in place on the shaft by recesses formed in the adjacent faces of the piston discs, which are also formed to accommodate packing rings 36ª which are triangular in cross section. It should be noted that the arrangement or the shape of the packing rings 36ª is by no means critical since their sole purpose is to prevent fluid from passing from one side of the piston to the other and between the piston discs and piston rod 31. Any conventional seal ring placed between the opposing surfaces of the discs and piston rod would suffice and could be retained in a groove formed in either the discs or the piston rod. The type of rings shown merely as an illustration at 36ª could be retained in a number of ways including conventional methods of bonding. In lateral depth the last-mentioned recesses are slightly less than one half the width of the shear ring 36 for the purpose of holding the faces of the disc apart sufficiently and provide a space 37 to allow for inaccuracies of machining.

The peripheries of the piston discs are each recessed to provide them with annular flanges 32ª, 33ª on their adjacent edges and similar flanges 32ᵇ, 33ᵇ on their outer edges. Surrounding the piston and snugly fitting the space between it and the cylinder wall with a sliding fit therein is a wear ring 40 (Fig. 1) composed of two parts 41, 42 (Fig. 2) which are recessed on their inner faces to provide lateral shoulders 40ª, 40ᵇ which straddle the central piston flanges 32ª, 33ª. Also carried on the circumference of the piston discs are piston packing rings 43, 44. These may be cup shaped in cross section as shown for the purpose of illustration. They face in opposite directions and are backed against shims 43ª, 44ª lying at the opposite sides of the central wear ring 40 and held in this position by the outer flanges 32ᵇ, 33ᵇ on the piston discs. These shims serve to close the spaces between the meeting ends of the semi-circular portions of the ring 40 to prevent the composition packing ring from being extended thereinto. They are cut circularly to size from thin metal and to permit their application in place are severed at one place on a diagonal line.

From the foregoing description of my present invention it will be seen that I have devised a novel piston construction wherein the simplicity and efficiency of its interlocking elements produce a decided advantage and advancement in the hydraulic media art. This construction has provided the industry with a new piston which is not only more efficient in its function in connection with a fluid motor, but which is also economical as to original manufacture and as to time and labor subsequently required for assembly and disassembly of the unit.

While a preferred form of the invention has been shown and described, it will be understood that variation in details of form may be made without departure from the invention as defined in the appended claims.

I claim:

1. In a fluid motor comprising a cylinder and heads thereon, a piston rod guided in the heads having an intermediate annular recess, a ring fitted in the rod recess and extending beyond its periphery, piston discs on the rod at opposite sides of said ring, a second ring overlapping the proximate faces of the discs serving to hold them in engagement with said first ring and piston packings carried on the peripheries of said discs at each side of said second ring.

2. In a fluid motor comprising a cylinder and heads thereon, a piston rod guided in the heads having an intermediate annular recess, a shear ring fitted in the rod recess and extending beyond its periphery, piston discs on the rod at opposite sides of said ring, a wear ring overlapping the proximate faces of the discs serving them in engagement with said shear ring and packing rings carried on the peripheries of said discs at each side of the wear ring.

3. In a fluid motor comprising a cylinder and heads thereon, a piston rod guided in the heads having an intermediate annular recess, piston discs on the rod having in their proximate faces cavities alined with said recess, means fitted in the rod recess and extending beyond its periphery for reception by said cavities, flanges on the peripheries of the discs, a ring surrounding said discs and embracing said flanges to lock the discs together and packing rings on the discs at opposite sides of said ring.

4. In a fluid motor comprising a cylinder and heads thereon, a piston rod guided in the heads having an intermediate annular recess, a shear ring rectangular in cross section fitted in the rod recess and extending beyond its periphery, piston discs on the rod having in their proximate faces cavities receiving approximately one half of the ring, flanges on the peripheries of the discs, a wear ring surrounding said discs and embracing said flanges to lock the discs together and piston packings on the discs at opposite sides of the wear ring.

5. In a fluid motor comprising a cylinder and heads thereon, a piston rod guided in the heads having an intermediate annular recess, a divided shear ring fitted in the rod recess and extending beyond its periphery, piston discs on the rod having in their proximate faces cavities receiving approximately one half of the ring, flanges on the peripheries of the discs at their proximate faces, a sectional wear ring surrounding said discs and embracing said flanges to lock the discs together and piston packings on the discs at opposite sides of the wear ring.

6. In a fluid motor comprising a cylinder and heads thereon, a piston rod guided in the heads having an intermediate annular recess, a two part shear ring fitted in the recess forming an abutment on the rod, circular piston discs on the rod engaging opposite sides of said abutments, outwardly extending pairs of spaced flanges on the periphery of the discs forming annular grooves therein, a two part wear ring grooved on its inner face embracing the proximate flanges on the two discs and serving to lock them in engagement with the shear ring and piston rings lying in the piston disc grooves at opposite sides of the wear ring.

7. In a fluid motor comprising a cylinder and heads thereon, a piston rod guided in the heads having an intermediate annular recess, a two part shear ring fitted in the recess forming an abutment on the rod, circular piston discs on the rod engaging opposite sides of said abutments, outwardly extending pairs of spaced flanges on the periphery of the discs forming annular grooves therein, a two part wear ring grooved on its inner face embracing the proximate flanges on the two discs and serving to lock them in engagement with the shear ring and piston rings lying in the piston disc grooves at opposite sides of the wear ring, and shims between each of said piston rings and said wear ring.

8. In a fluid motor comprising a cylinder and heads thereon, a piston rod guided in the heads having an intermediate annular recess, a shear ring rectangular in cross section fitted in the rod recess and extending beyond its periphery, piston discs on the rod having in their proximate faces cavities receiving approximately one half of the ring, a packing ring between each disc and the piston rod, flanges on the peripheries of the discs, a wear ring surrounding said discs and embracing said flanges to lock the discs together and piston packings on the discs at opposite sides of the wear ring.

9. In a fluid motor comprising a cylinder and heads thereon, a piston rod positioned coaxial with and slidable relative to at least one of said heads, a piston assembly attached to said piston rod and slidable relative to the inner surface of said cylinder, said piston rod having an intermediate annular recess, arcuate segments fitted therein and radially extending beyond the periphery of the piston rod, piston discs fitted to the piston rod at both sides of the radially extending arcuate segments and provided with proximate face cavities enveloping the extended portion of said segments, said piston discs having annular oustanding flanges on their proximate peripheral edges, a segmented wear ring circumventing the piston discs and having annular inwardly extending flanges at both sides suitably spaced to embrace the flanges on the piston discs, piston cup rings positioned to each side of said wear ring with their backs toward said wear ring and retained by outwardly extending annular flanges formed out of the remote peripheral edges of the piston discs and shims interposed between said cups and wear ring.

VANCE C. STERRETT.

REFERENCES CITED

The following references are of record in the file of this patent:

UNITED STATES PATENTS

| Number | Name | Date |
|---|---|---|
| 531,723 | Hill | Jan. 1, 1895 |
| 648,079 | Prince, Jr. | Apr. 24, 1900 |
| 2,059,446 | Eastman | Nov. 3, 1936 |